Nov. 20, 1951  J. J. OLSEN  2,575,464
VALVE
Filed June 22, 1949
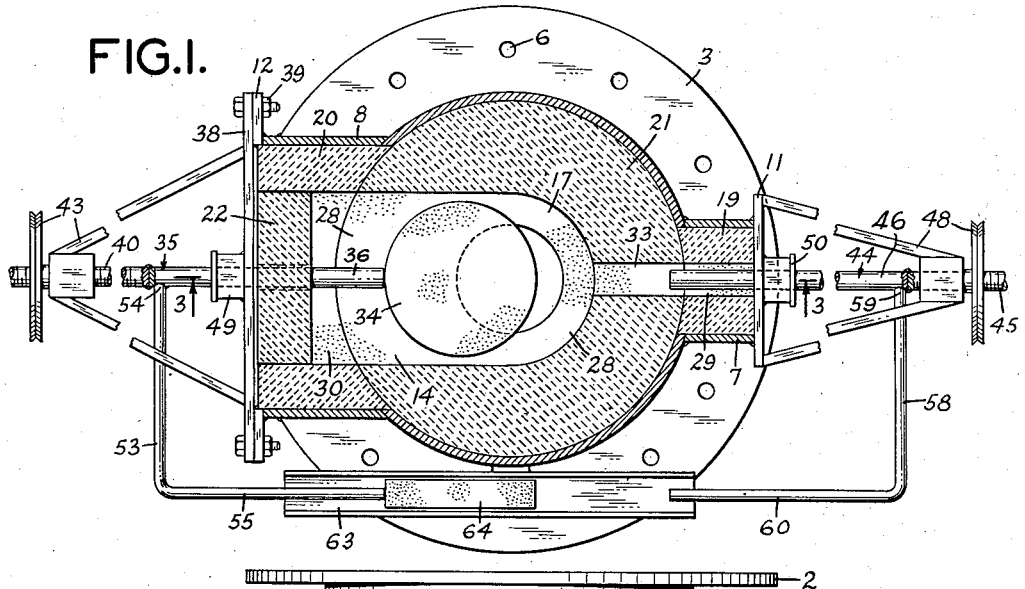
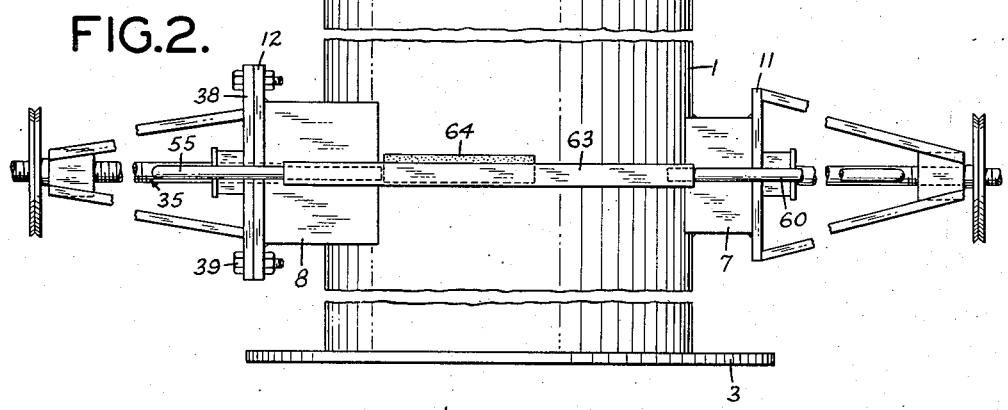
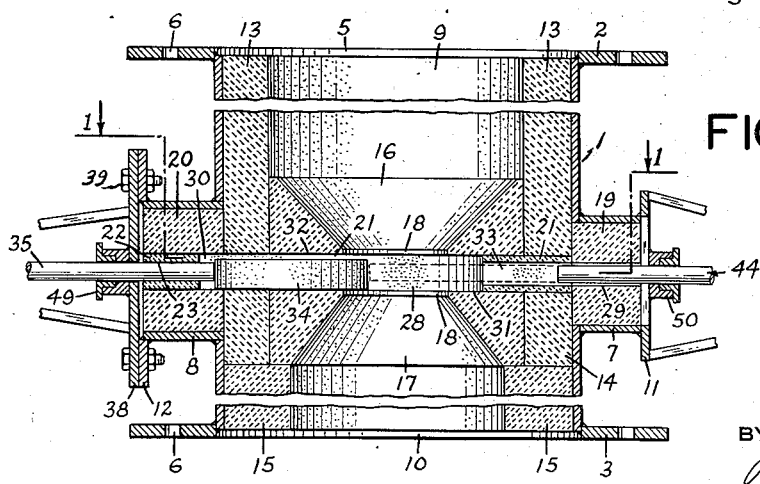
INVENTOR.
JOHN J. OLSEN
BY
ATTORNEY.

Patented Nov. 20, 1951

2,575,464

UNITED STATES PATENT OFFICE 2,575,464

VALVE

John J. Olsen, Buffalo, N. Y., assignor to Allied Chemical & Dye Corporation, New York, N. Y., a corporation of New York Application June 22, 1949, Serial No. 100,587

8 Claims. (Cl. 251—61)

This invention relates to apparatus for controlling the flow of gases. More specifically, the invention relates to means for controlling the flow of gases of highly elevated temperature.

In usual operations involving handling gases at temperatures up to about 1800° F., it has been normal practice to control flow by employing conventional types of valves using metal as a material of construction, e. g. valves of the "butterfly" type. At temperatures appreciably above 1800° F., i. e. in the range 1800–2300° F., particularly where the gas is corrosive, serious corrosion and/or erosion of the movable closure means and associated metal parts which come into contact with the hot gas stream is likely to result.

One object of this invention is to provide a valve for controlling the flow of, e. g. a hot gas stream, which valve is so constructed as to avoid substantial corrosion and/or erosion of its parts. A further and more preferred object is to provide such a valve in which the position of the movable internal closure means can be readily ascertained by a casual external observation of the valve.

The manner in which these objects are attained may be best understood from an inspection of the attached drawings in which like reference numbers indicate the same part on the various figures.

Fig. 1 represents a partial horizontal section of the valve assembly, taken along plane 1—1 of Fig. 3.

Fig. 2 is a front elevation of the valve assembly.

Fig. 3 is a vertical section of the assembly taken along plane 3—3 in Fig. 1, with part of the apparatus shown in phantom.

The device of this invention illustrated in the drawings comprises generally a valve body, having a passageway for passage of gas, freely slideable closure means (disc) disposed in the valve body and arranged to close or partially close the passageway, and externally disposed valve stems adapted to be moved axially inward to adjust the position of the disc, and then be withdrawn away from the disc and out of the hot zone of gases in the passageway. A particular embodiment of the invention includes provision of externally arranged rods fastened to the valve stems which cooperate with external adjustable indicator means for indicating the position of the closure means within the valve body. In the embodiment shown, the rods impart movement to a block similar to the movement imparted to the disc, thereby to indicate the position of the disc within the valve body.

Referring, for the moment, to Fig. 3, reference number 1 indicates a vertical cylindrical pipe of suitable length having a top flange 2 and a bottom flange 3. Bolt holes 6 are provided in arrangement and number suitable for attaching adjacent pipe sections. Bonnets 7 and 8, having a common axis, are welded to pipe section 1 on opposite sides thereof. These bonnets are provided with plate 11 and flange 12, respectively. Pipe section 1 and bonnets 7 and 8 are built up internally with any suitable refractory or other heat-resistant non-heat-conducting material such as cylindrically formed brick work 13, 14 and 15. Passageway 9 is formed within pipe 1 and its refractory linings shown, said passageway connecting ports 5 and 10. Opposed tapered members 16 and 17 are supplied in passageway 9 to provide for an orifice 18 of reduced diameter for passage of gas and to further provide for a Venturi effect in the flowing gas stream to minimize pressure drop. Bonnets 7 and 8 are lined with refractory material 19 and 20, respectively, to prevent contact of hot gases with the metal in these areas and to form circular aperture 29 and rectangular opening 30. Loose refractory brick 22, having hole 23 passing therethrough, is disposed in and substantially fills the outward end of opening 30.

Disposed between top refractory sections 13 and 16 on the one hand and bottom refractory sections 14 and 17 on the other hand, is refractory section 21, best seen in Fig. 1. Refractory 21 is of arcuate shape as shown, providing therein and between said refractory sections thereabove and therebelow, a planarly formed recess or slot 28, disposed transversely to passageway 9. Aperture 33 is formed transversely in arcuate refractory section 21 and generally in alignment with recess 28. Recess 28 therefore communicates horizontally with openings 29, 33, 23 and 30 and communicates vertically by way of orifices 18 with passageway 9.

Disc 34, constructed of a suitable refractory, preferably a high (e. g. 85% or greater) silicon carbide content material, is disposed in recess 28 and adapted to be slid transversely, substantially horizontally either to the right or the left. Said disc has therefore, open and at least partly closed position with respect to said passageway. It will be appreciated that member 34 may be of other shape, e. g. a rectangular plate, and recess 28, rather than being of arcuate form, may be of shape to accommodate said plate. Disc 34 is shown in various positions on the several drawings.

Valve stem 35 extends through hole 23 and opening 30 and is movable axially toward and away from the center of pipe section 1. Stem 35 therefore may have positions abutting plate or disc 34 and positions removed from said plate or disc and preferably removed from passageway 9 and enclosed within refractory lining 13, 14 and 20. Plate 38 is bolted to flange 12 by means of bolts 39. Valve stem 35 comprises threaded portion 40, suitably constructed of mild steel and, welded thereto, portion 36, preferably made of heat resistant metal such as chrome (e. g. "stainless") steel. The valve stem actuating and supporting means are indicated generally at 43. On the opposite side of pipe section 1, valve stem 44 extends inwardly toward the center of the valve assembly and through apertures 29 and 33 in a manner similar to oppositely disposed valve stem 35. Valve stem 44, similarly as valve stem 35, comprises mild steel threaded portion 45 and chrome steel portion 46 welded thereto, and is movable axially inwardly toward and outwardly from pipe section 1. The valve stem actuating means and support therefor is represented generally by 48, said means being mounted on plate 11 which is fixed to bonnet 7 as shown. Sealing glands 49 and 50 fixed to plates 38 and 11, respectively, are disposed around each of the valve stems, and have relative movable and frictional engagement with said stems, thereby effecting a fluid tight joint between the stem and valve body, and preventing egress of gas through the space therebetween.

Rod 53 (Fig. 1) is welded to valve stem 35 at 54. A portion of rod 53 extends outwardly from valve stem 35, while the remote portion thereof, 55, is parallel to said valve stem and extends generally inwardly toward the center of pipe section 1. As will be apparent from an inspection of Fig. 1, rod 53 extends inwardly to the same extent as does valve stem 35. This is a particular feature of one embodiment of the invention. In a similar manner, rod 58 is welded to valve stem 44 at 59, extends outwardly from said valve stem and then parallel thereto generally inwardly, toward the center of pipe section 1 at 60. Similar to rod 53, rod section 60 extends inwardly to the same extent as does valve stem 44. Channel 63, shown in Figs. 1 and 2 is mounted horizontally externally of and adjacent to pipe section 1, and generally parallel to valve stems 35 and 44. Parallel sections 55 and 60 of rods 53 and 58 are adapted to slide within channel 63, accordingly as valve stems 35 and 44 are adjusted. Block 64 is also adapted to slide within channel 63 and to be pushed by rod sections 55 and 60. The long dimension of block 64 is preferably substantially equal to the diameter of disc 34, for reasons hereinafter disclosed.

As previously indicated, it is a preferred object of this invention to provide gas flow control apparatus in which materials adversely affected by the hot, possibly corrosive gas stream will not come into direct contact with the hottest portion of said gas stream and will therefore be substantially protected. From the following description of the manner in which the apparatus of this invention is operated, it will be apparent how this preferred object of the invention may be obtained. Highly heated gas, e. g. in a temperature range of 1800-2300° F. may flow either upwardly or downwardly in conduit 9, through orifices 18 and into communicating pipes not shown. During normal operation, valve stems 35 and 44 are maintained in a retracted position, away from the center of pipe section 1, and substantially within refractory linings 19 and 20 in bonnets 7 and 8, respectively. In these positions, the valve stems (usually constructed of metal, which is relatively more susceptible to attack by the hot corrosive gas stream than is the refractory) are sheltered. Assume that the disc 34 is in a position shown in Fig. 1, i. e. the conduit orifice 18 is substantially closed and it is desired to open the valve permitting passage of a greater quantity of gas. Valve stem actuating means 48 is operated causing valve stem 44 to move inwardly to the position shown in phantom in Fig. 3, thereby pushing disc 34 to the extreme left of orifice 18. Simultaneously with said movement of disc 34, block 64 is pushed by parallel section 60 of rod 58 in channel 63 to a position opposite that of the disc within the valve assembly. After suitable adjustment has been made, valve stem 44 is withdrawn to substantially its original position as shown in Fig. 1. In this operation, the valve stem 44 is not maintained in the hot gas in the region of conduit 9 for a length of time sufficient to cause any serious damage thereto.

In a similar manner, if it is desired to close orifice 18 to reduce throughput of gas, valve stem 44 being in the retracted position as shown in Fig. 1, valve stem 35 is moved inwardly by operating actuating means 43 and disc 34 will be moved inwardly until adjustment of orifice opening has been effected. Simultaneously with said movement of disc 34, block 64 is pushed by parallel section 55 of rod 53 through channel 63 and finally occupies a position opposite that of disc 34 inside of the valve assembly. Thereafter the valve stem 35 is withdrawn to substantially a position shown in Fig. 3.

Since parallel section 55 of rod 53 extends inwardly to the same extent as does valve stem 35 and parallel section 60 of rod 58 extends inwardly to the same extent as does stem 44, it will be apparent that movement of disc 34 in recess 28 will be duplicated by a similar movement of block 64 in channel 63. Upon withdrawing the valve stem, block 64 will remain in a position opposite that of disc 34 within the valve body. Accordingly, block 64 serves as an indicating means to show by easy external observation, the position of the disc 34 within the valve assembly, thereby giving a measure of the approximate size of the opening for passage of gas through orifice 18.

Opening 30 in bonnet 8 and its refractory lining 20 (as indicated in Figs. 1 and 3) is constructed sufficiently large to permit insertion and removal of disc 34 therethrough. Hence, putting together or dismantling of the valve assembly may be effected by removing bolts 39, plate 38, loose brick 22, and, by suitable manipulation, extricating disc 34 from recess 28.

In the light of the disclosure of this application, it will become apparent to skilled mechanics that parallel sections 55 and 60 and rods 53 and 58 need not necessarily extend inwardly the same distance as do their respective valve stems, although such construction is preferred. A significant feature of the relation between valve stem and rod length, is that the distance between the inward ends of the two valve stems in a given position be the same as the distance between the inward ends of the two rods. As long as this feature is provided, the movement of block 64 will duplicate movement of disc 34 and the position of the disc 34 within the valve assembly, although off-set from the position of the block 64, may be ascertained from the block position by suitable calibration.

The block and channel indicator means disclosed in the drawing offers preferred advantages such as simple and economical construction. However, other suitable indicator means may be substituted within the broader scope of the invention. Indicator means (for example, dial indicators) which can be operated by rod means 53 and 58 may serve the desired purpose. In such embodiments, it may not be necessary to have the rod lengths correspond with the valve stem lengths, as in the case of the block and channel indicator. Such other means will become apparent to those skilled in the art.

Although the pipe section 1 has been illustrated as being in a vertical position, the invention is not limited thereto. Said pipe section may be in a horizontal or inclined position. If the inclination of pipe section 1 is changed from that disclosed in the drawings, it may be desired to modify the angle at which the transverse surfaces of recess 28 (i. e. the flat surfaces represented by lines 31 and 32 in Fig. 3) intersect the axis of pipe 1. This may be done within the scope of the invention provided only that the slope of the surfaces of recess 28 upon which disc 34 slides (in the direction of the sliding motion) does not exceed the angle of repose of disc 34. Disc 34 has been described as sliding on its surface transverse to passageway 9. If desired, e. g. when controlling the flow in a horizontal pipe section, recess 28 may be disposed in a vertical plane, in which case disc 34 may be caused to slide on its edge in assuming various positions within the valve. Main objects of the invention heretofore described, including adequate flow control, may be obtained in the latter embodiment. In the latter embodiment, however, it may be desired to provide a plate member (instead of disc 34) having a flat sliding edge (e. g. a rectangular plate as suggested above), so that upon shoving the plate (by means of the valve stems), there is no tendency for the plate to roll and so that there is no tendency of the plate to move after adjustment.

The relative dimensions of apparatus shown, specifically the dimensions of recess 28 and disc 34, may be varied to some extent. An important factor in determining suitable clearance between the surfaces of disc 34 and the walls of recess 28 is thermal expansion of the apparatus, i. e. the recess 28 should be made large enough in width and thickness to accommodate expansion of disc 34 at the highly elevated temperatures maintained in and near passageway 9. This consideration applies also in determining the dimension of opening 30, through which disc 34 must pass when disassembling the valve. When gas is passed upwardly through passageway 9, particularly at high velocities, or when recess 28 and member 34 are disposed vertically, as suggested above, it may be expedient to provide for relatively small clearances between member 34 and recess 28 to minimize by-passing of gas caused by the tendency of the gas stream to move disc 34 off its seat.

Any suitable refractory material may be utilized in the apparatus of this invention. If desired, instead of employing refractory lining constructed from several pieces, (i. e. bricks) substantially the entire lining of pipe section 1 may be formed in a single piece.

I claim:

1. A valve assembly comprising a valve body having a longitudinal passageway for passage of a gas stream, closure means in said body freely slideable in direction transverse to flow of adjacent gas stream, thereby to control rate of flow of said gas stream through said passageway, two valve stems disposed on opposite sides of said valve body, extending inwardly into said valve body and each being axially movable in direction transverse to flow of gas stream between said stems, each of said stems having positions in which its inner end abuts said closure means and positions in which its inner end is removed from said closure means and from said passageway, means for actuating the valve stems whereby, by axial movement thereof, said closure means may be caused to slide within said valve body.

2. A valve assembly comprising a valve body having a non-heat-conducting, heat resistant lining forming a longitudinal passageway for passage of a gas stream, a substantially planarly formed recess in said lining, the plane of said recess being disposed substantially transversely to the axis of adjacent passageway and to flow of adjacent gas stream, a plate in said recess freely slideable to control rate of flow of said gas stream through said passageway, two valve stems disposed on opposite sides of said valve body, extending inwardly into said valve body and each being axially movable in direction transverse to flow of gas stream between said stems, each of said stems having positions in which its inner end abuts the edge of said plate and positions in which its inner end is removed from said plate and from said passageway enclosed within said lining, means for actuating the valve stems whereby, by axial movement thereof, said plate may be caused to slide within said recess.

3. A valve assembly comprising a valve body having a refractory lining forming a longitudinal passageway for passage of a gas stream, a substantially planarly formed recess in said lining, the plane of said recess being disposed substantially horizontally and transversely to the axis of adjacent passageway and to flow of adjacent gas stream, a plate in said recess freely slideable in a substantially horizontal direction thereby to control rate of flow of said gas stream through said passageway, two valve stems disposed on opposite sides of said valve body, extending inwardly into said valve body and each being axially movable in direction transverse to flow of gas stream between said stems, each of said stems having positions in which its inner end abuts the edge of said plate and positions in which its inner end is removed from said plate and from said passageway enclosed within said lining, means for actuating the valve stems whereby, by axial movement thereof, said plate may be caused to slide within said recess, an individual sealing gland disposed around each of said stems, said glands having relative movable and frictional engagement with said stems and effecting a fluid tight joint between the stem and the valve body.

4. A valve assembly comprising a valve body having inlet and outlet ports, a non-heat-conducting, heat resistant lining in said body forming a passageway connecting said ports, closure means in said body freely slideable in direction transverse to the longitudinal axis of adjacent passageway, thereby to control rate of flow of said gas stream through said passageway, two valve stems disposed on opposite sides of said valve body, extending inwardly into said valve body and each being movable in direction of its own axis, transversely to the longitudinal axis of passageway between said stems, each of said stems having positions in which its inner end abuts said closure means and positions in which its inner end is removed from said closure means and from said passageway enclosed within said lining, means for actuating the valve stems whereby, by axial movement thereof, said closure means may be caused to slide within said valve body, individual rod means positively connected to the external portion of each of said valve stems and arranged externally of said valve body, indicator means engaging said rod means for indicating the position of said closure means within said valve body, and an individual sealing gland disposed around each of said stems, said glands having relative movable and frictional engagement with said stems and effecting a fluid tight joint between the stem and the valve body.

5. A valve assembly comprising a valve body having inlet and outlet ports, a refractory lining in said body forming a passageway connecting said ports, a substantially planarly formed recess in said refractory lining, the plane of said recess being disposed substantially transversely to the axis of adjacent passageway, a freely slideable plate in said recess having an open and a substantially closed position with respect to said passageway, valve stems disposed on opposite sides of said valve body, extending inwardly into said valve body and each being movable in direction of its own axis, transversely to the longitudinal axis of passageway between said stems, each of said stems having positions in which its inner end abuts the edge of said plate and positions in which its inner end is removed from said plate and from said passageway enclosed within said lining, means for actuating the valve stems whereby, by axial movement thereof, said plate may be caused to slide within said recess, individual rod means positively connected to the external portion of each of said valve stems and arranged externally of said valve body, and indicator means in contact with said rod means for indicating the position of said plate within said valve body.

6. A valve assembly comprising a valve body having a refractory lining forming a longitudinal passageway for passage of a gas stream, a substantially planarly formed recess in said refractory lining, the plane of said recess being disposed substantially horizontally and transversely to the axis of adjacent passageway and to flow of adjacent gas stream, a plate in said recess freely slideable in a substantially horizontal direction and having an open and a closed position with respect to said passageway, two valve stems disposed on opposite sides of said valve body, extending inwardly into said valve body and each being axially movable in direction transverse to flow of gas stream between said stems, each of said stems having positions in which its inner end abuts the edge of said plate and positions in which its inner end is removed from said plate and from said passageway enclosed within said lining, means for actuating the valve stems whereby, by axial movement thereof, said plate may be caused to slide within said recess, adjustable indicator means disposed externally of and adjacent to said valve body, an individual rod positively connected to the external portion of each of said valve stems, arranged externally of said valve body and in contact with said indicator means, said rods being adapted, upon movement of said valve stems, to cooperate with said indicator means and thereby indicate the position of said plate within said valve body, an individual sealing gland disposed around each of said stems, said glands having relative movable and frictional engagement with said stems and effecting a fluid tight joint between the stem and the valve body.

7. A valve assembly comprising a valve body having a longitudinal passageway for passage of a gas stream, closure means in said body freely slideable in direction transverse to flow of adjacent gas stream, said means having an open and a closed position with respect to said passageway, two valve stems disposed on opposite sides of said valve body, extending inwardly into said valve body and each being axially movable in direction transverse to flow of gas stream between said stems, each of said stems having positions in which its inner end abuts said closure means and positions in which its inner end is removed from said closure means and from said passageway, means for actuating the valve stems whereby, by axial movement thereof, said closure means may be caused to slide within said valve body, an individual rod positively connected at one of its ends to the external portion of each of said valve stems and arranged externally of said valve body, adjustable indicator means disposed externally of said valve body and adjacent thereto, the other end of each of said rods extending inwardly toward one another and toward said indicator means, said rods being adapted, upon movement of said valve stems to adjust the position of said closure means to effect corresponding adjustment to the position of said indicator means thereby to indicate the position of said closure means within said valve body.

8. A valve assembly comprising a valve body having a longitudinal passageway for passage of a gas stream, closure means in said body freely slideable in direction transverse to flow of adjacent gas stream, said means having an open and a closed position with respect to said passageway, two valve stems disposed on opposite sides of said valve body, extending inwardly into said valve body and each being axially movable in direction transverse to flow of gas stream between said stems, each of said stems having positions in which its inner end abuts said closure means and positions in which its inner end is removed from said closure means and from said passageway, means for actuating the valve stems whereby, by axial movement thereof, said closure means may be caused to slide within said valve body, an individual rod positively connected at one of its ends to the external portion of each of said valve stems and arranged externally of said valve body, a block having dimension in the direction of axial movement of said stems substantially the same as similar dimension of said closure means, said block being horizontally slideably mounted externally of said valve body and adjacent thereto, the other end of each of said rods extending inwardly toward one another and toward said block, the distance between the inner ends of said rods being substantially the same as the distance between the inner ends of said stems, said rods having positions in contact with and out of contact with said block and being adapted, upon movement of said valve stems to adjust the position of said closure means, to push said block and thereby effect corresponding adjustment to the position of said block and indicate the position of said closure means within said valve body.

JOHN J. OLSEN.

REFERENCES CITED

The following references are of record in the file of this patent:

UNITED STATES PATENTS

| Number | Name | Date |
|---|---|---|
| 312,724 | Jarboe | Feb. 24, 1885 |
| 1,029,600 | Foster | June 18, 1912 |
| 1,031,554 | Hoffman | July 2, 1912 |
| 1,182,686 | Johnson | May 9, 1916 |
| 1,256,330 | Knox | Feb. 12, 1918 |
| 1,781,698 | Obrien | Nov. 18, 1930 |
| 1,806,462 | Hopkins | May 19, 1931 |
| 2,166,304 | Laurent | June 18, 1939 |